(12) United States Patent
Chandrashekar et al.

(10) Patent No.: US 7,890,744 B2
(45) Date of Patent: Feb. 15, 2011

(54) ACTIVATING CONTENT BASED ON STATE

(75) Inventors: Sridhar Chandrashekar, Redmond, WA (US); Dale E. Rogerson, Seattle, WA (US); J. Shane McRoberts, Seattle, WA (US); Wenlong Dong, Redmond, WA (US); Andrew D. Reddish, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1099 days.

(21) Appl. No.: 10/819,606

(22) Filed: Apr. 7, 2004

(65) Prior Publication Data

US 2005/0228781 A1    Oct. 13, 2005

(51) Int. Cl.
G06F 7/04     (2006.01)
G06F 17/30    (2006.01)
G06F 9/00     (2006.01)
G06F 9/24     (2006.01)
G06F 15/177   (2006.01)
G06F 1/24     (2006.01)
G06F 17/00    (2006.01)
G06F 17/20    (2006.01)
G06F 17/21    (2006.01)
G06F 17/22    (2006.01)
G06F 17/24    (2006.01)
G06F 17/25    (2006.01)
G06F 17/26    (2006.01)
G06F 17/27    (2006.01)
G06F 17/28    (2006.01)
G06F 3/00     (2006.01)
H04N 7/16     (2006.01)
B41K 3/38     (2006.01)

(52) U.S. Cl. .................... 713/100; 726/2; 726/26; 713/1; 380/59; 715/234; 715/273; 715/744

(58) Field of Classification Search .................. 380/241
See application file for complete search history.

(56) References Cited

U.S. PATENT DOCUMENTS 5,263,167 A    11/1993   Conner, Jr. et al.

(Continued)

OTHER PUBLICATIONS

Burrell, J. et al., "Context-Aware Computing: A Test Case", *UbiComp: ubiquitous Computing, 4th international Conference, Proceedings(Lecture Note in Computer Science)*, 2002, 2498, 1-15.

(Continued)

*Primary Examiner*—Nasser Moazzami
*Assistant Examiner*—Oscar A Louie
(74) *Attorney, Agent, or Firm*—Woodcock Washburn LLP

(57) ABSTRACT

A content author provides content to be displayed, including some content elements for which display is conditional on the state of the machine in which the content will be viewed. The conditional statements controlling the display of these content elements, in one embodiment refer to states provided by a state monitor. The state may refer to the state of any aspect of the viewing environment, including hardware, software, firmware, user preferences, software operating modes, and any other detectable state. The resulting content is optionally combined with other similar content via a structural transform. This content is transformed with a presentation transform. One of the transforms checks the states and resolves the conditional statements included by the content author. The result of the transforms is presentation data. A display of this presentation data includes the content which, according to the conditional statements and the state of the viewing environment is appropriate for display.

21 Claims, 5 Drawing Sheets

U.S. PATENT DOCUMENTS

| | | | |
|---|---|---|---|
| 5,319,580 A * | 6/1994 | Sakata et al. | 702/185 |
| 5,602,990 A * | 2/1997 | Leete | 714/46 |
| 5,701,469 A | 12/1997 | Brandli et al. | |
| 5,715,468 A | 2/1998 | Budzinski | |
| 5,819,089 A * | 10/1998 | White | 718/106 |
| 5,850,446 A | 12/1998 | Berger et al. | |
| 5,911,776 A | 6/1999 | Guck | |
| 5,999,179 A * | 12/1999 | Kekic et al. | 715/734 |
| 6,038,598 A * | 3/2000 | Danneels | 709/219 |
| 6,041,287 A * | 3/2000 | Dister et al. | 702/182 |
| 6,189,002 B1 | 2/2001 | Roitblat | |
| 6,249,784 B1 | 6/2001 | Macke et al. | |
| 6,253,326 B1 | 6/2001 | Lincke et al. | |
| 6,260,035 B1 * | 7/2001 | Horvitz et al. | 706/60 |
| 6,260,037 B1 | 7/2001 | Bestgen et al. | |
| 6,262,730 B1 * | 7/2001 | Horvitz et al. | 715/707 |
| 6,263,440 B1 | 7/2001 | Pruett et al. | |
| 6,327,590 B1 | 12/2001 | Chidlovskii et al. | |
| 6,456,234 B1 * | 9/2002 | Johnson | 342/357.09 |
| 6,473,800 B1 | 10/2002 | Jerger et al. | |
| 6,487,553 B1 | 11/2002 | Emens et al. | |
| 6,493,702 B1 | 12/2002 | Adar et al. | |
| 6,519,592 B1 | 2/2003 | Getchius et al. | |
| 6,529,909 B1 | 3/2003 | Bowman-Amuah | |
| 6,535,896 B2 | 3/2003 | Britton et al. | |
| 6,539,396 B1 | 3/2003 | Bowman-Amuah | |
| 6,557,008 B1 | 4/2003 | Temple, III et al. | |
| 6,562,076 B2 | 5/2003 | Edwards et al. | |
| 6,585,778 B1 | 7/2003 | Hind et al. | |
| 6,628,304 B2 * | 9/2003 | Mitchell et al. | 715/734 |
| 6,633,867 B1 | 10/2003 | Kraft et al. | |
| 6,650,998 B1 | 11/2003 | Rutledge et al. | |
| 6,658,625 B1 | 12/2003 | Allen | |
| 6,691,106 B1 | 2/2004 | Sathyanarayan | |
| 6,788,313 B1 * | 9/2004 | Heil | 715/705 |
| 6,795,868 B1 * | 9/2004 | Dingman et al. | 709/246 |
| 6,810,395 B1 | 10/2004 | Bharat | |
| 6,820,135 B1 * | 11/2004 | Dingman et al. | 709/246 |
| 6,857,102 B1 | 2/2005 | Bickmore et al. | |
| 6,892,196 B1 | 5/2005 | Hughes | |
| 6,906,719 B2 | 6/2005 | Chadha et al. | |
| 6,968,332 B1 | 11/2005 | Milic-Frayling et al. | |
| 6,968,333 B2 | 11/2005 | Abbott et al. | |
| 6,976,017 B1 | 12/2005 | Getchius | |
| 6,990,629 B1 * | 1/2006 | Heaney et al. | 715/500 |
| 6,996,776 B1 | 2/2006 | Makely et al. | |
| 6,996,781 B1 * | 2/2006 | Myers et al. | 715/763 |
| 7,039,861 B2 | 5/2006 | Yagi | |
| 7,047,498 B2 | 5/2006 | Lui et al. | |
| 7,096,424 B2 * | 8/2006 | Graham et al. | 715/274 |
| 7,120,622 B2 | 10/2006 | Zellweger et al. | |
| 7,162,697 B2 | 1/2007 | Markel | |
| 7,174,370 B1 * | 2/2007 | Saini et al. | 709/220 |
| 7,177,403 B2 * | 2/2007 | Meyerson et al. | 379/88.13 |
| 7,185,274 B1 | 2/2007 | Rubin et al. | |
| 7,263,522 B2 * | 8/2007 | Tremblay | 1/1 |
| 7,305,380 B1 | 12/2007 | Hoelzle et al. | |
| 7,472,349 B1 | 12/2008 | Srivastava et al. | |
| 7,506,257 B1 | 3/2009 | Chavez et al. | |
| 7,519,578 B2 | 4/2009 | Mihai et al. | |
| 7,523,095 B2 | 4/2009 | Gates et al. | |
| 7,716,158 B2 | 5/2010 | McConnell | |
| 2002/0015056 A1 * | 2/2002 | Weinlaender | 345/705 |
| 2002/0073057 A1 | 6/2002 | Benoit et al. | |
| 2002/0087535 A1 | 7/2002 | Kotcheff et al. | |
| 2002/0138479 A1 | 9/2002 | Bates et al. | |
| 2002/0169856 A1 | 11/2002 | Plow et al. | |
| 2002/0184401 A1 | 12/2002 | Kadel et al. | |
| 2002/0194166 A1 | 12/2002 | Fowler | |
| 2003/0037076 A1 | 2/2003 | Bravery et al. | |
| 2003/0059001 A1 * | 3/2003 | Meyerson et al. | 379/88.13 |
| 2003/0144911 A1 | 7/2003 | Lin-Hendel | |
| 2003/0217052 A1 | 11/2003 | Rubenczyk et al. | |
| 2003/0220908 A1 | 11/2003 | Chou | |
| 2003/0229900 A1 | 12/2003 | Reisman | |
| 2004/0083431 A1 * | 4/2004 | Graham et al. | 715/526 |
| 2004/0107193 A1 * | 6/2004 | Tremblay | 707/3 |
| 2004/0194141 A1 | 9/2004 | Sanders | |
| 2005/0050000 A1 | 3/2005 | Kwok et al. | |
| 2005/0065773 A1 | 3/2005 | Huang et al. | |
| 2005/0097188 A1 | 5/2005 | Fish | |
| 2005/0114757 A1 | 5/2005 | Sahota et al. | |
| 2005/0131920 A1 | 6/2005 | Rust et al. | |
| 2005/0229099 A1 | 10/2005 | Rogerson et al. | |
| 2005/0229252 A1 | 10/2005 | Rogerson et al. | |
| 2008/0140705 A1 | 6/2008 | Luo | |

OTHER PUBLICATIONS

Canos, J.H. et al., "Building Safety Systems with Dynamic Disseminations of Multimedia Digital Objects", *D-Lib Magazine*, 2003, 9(1).

De Sutter, R. et al., "Dynamic Adaptation of Multimedia Data for Mobile Applications", *Proceedings of the SPIE—The International Society for Optical Engineering*, 2002, 4862, 240-248.

Finkelstein, L. et al., "Placing Search in Context: The Concept Revisited", *Proceedings of the 10th International Conference on World Wide Web*, 2001, 406-414.

Granmo, O.C. et al., "Dynamic Object-Oriented Bayesian Networks for Flexible Resource-Aware Content-Based Indexing of Media Streams", *Proceedings of 12th Scandinavian Conference on Image Analysis*, 2001, 587-594.

Lemlouma, T. et al., "Context-Aware Adaptation for Mobile Devices", *Proceedings 2004 IEEE International Conference on Mobile Data Management*, 2004, 106-111.

Lum, W.Y. et al., "A QoS-Sensitive Content Adaptation System for Mobile Computing", *Proceedings 26th Annual International Computer Software and Applications*, 2002, 680-685.

Ozturk, P., "Towards a Knowledge-Level Model of Context and Context use in Diagnostic Problems", *Applied Intelligence: The International Journal of Artificial intelligence, Neural Networks, and Complex Problem-Solving Technologies*, 1999, 10(2-3), 123-137.

Tsuji, S. et al., "A Framework to Provide Integrated Online Documentation", *ACM Special Interest Group for Design of Communications, Proceedings of the 19th Annual International Conference on Computer Documentation*, 2001, 185-192.

Bertino et al., "Securing XML Documents with Author-X", IEEE Internet Computing, May-Jun. 2001, 5(3), 21-31.

Damiani et al., "Design and Implementation of an Access Control Processor for XML Documents", Elsevier Science B.V., Computer Networks 33, (no month available) 2000, 16 pages.

Rutledge et al., "Finding the Story—Broader Applicability of Semantics and Discourse for Hypermedia Generation", Proceedings of the Fourteenth ACM Conference on Hypertext and Hypermedia, ACM Press, Aug. 2003, 10 pages.

Selkirk, "XML and security", BT Technology Journal, Springer, Jul. 2001, 19(3), 23-34.

W3C, "Extensible Markup Language (XML)", www.w3.org-XML, W3C Recommendation, accessed Jul. 12, 2010.

W3C, "Extensible Stylesheet Language (XSL)", W3C Recommendation, Dec. 5, 2006, 425 pages.

W3C, "XML Schema Requirements", www.w3.org-TR-1999-NOTE-xml-schema-req-19990215, Feb. 15, 1999, 1-5.

W3C, "XSL Transformations (XSLT)", Nov. 16, 1999, 92 pages.

Xavier, "XML based Security for E-Commerce Applications", Eighth Annual IEEE International Conference and Workshop on the Engineering of Computer Based Systems (ECBS '01), Apr. 17-Apr. 20, 2001, 10-17.

* cited by examiner

ACTIVATING CONTENT BASED ON STATE

CROSS-REFERENCE TO RELATED APPLICATIONS

The subject matter described herein is related to the subject matter disclosed in co-pending application Ser. No. 10/754,984 filed on Jan. 9, 2004 entitled "System and Method for Context Sensitive Searching." The subject matter described herein is also related to co-pending U.S. patent application Ser. No. 10/819,661, entitled "Presentation-Independent Semantic Authoring of Content," and U.S. patent application Ser. No. 10/819,607 entitled "In-Place Content Substitution via Code-Invoking Link," both filed on the same date as the present application.

FIELD OF THE INVENTION

This invention relates in general to the field of information technology. More particularly, this invention relates to a computing environment context to facilitate state-dependent selection and presentation of content to a user. Such adaptive content may be utilized in, e.g., a help system for software applications.

BACKGROUND OF THE INVENTION

In certain contexts, such as help systems for software applications, where information is presented to a user of a computer system, the information discusses the state of the machine. For example, when a user inquires as to how to change a specific setting for a printer attached to a printer running an operating system, the operating system's associated help system may provide the user with help information regarding changing the setting. The help content presented may require the user to have knowledge about and understand details about the setup and current functioning of the user's computer system. For example, the help content may ask how the printer is attached (e.g. local or networked), what version of some software application is running on the user's computer, or other details dependent on the setup and functioning of the user's computer, and may guide the user based on the answers to these questions. Providing help information in the alternative based on some detail of the user's computer system may be done by including all the information in the help content (e.g. "if the printer is a networked printer" will be followed by directions on changing the setting for a networked printer, but the same help screen may include "if the printer is a local printer" and directions on changing the setting for a local printer.) Providing help information in the alternative may also be accomplished by requesting that the user make a selection (e.g. "is the printer a networked or local printer?") and then presenting the applicable help information to the user.

In either instance, the user in such a situation is required to have some sophistication in knowing the setup of their computer system and the current state of the computer system. This requirement produces some confusion and dissatisfaction with less sophisticated users and requires additional time for even sophisticated users who are consulting the help system.

Additionally, help information may be related to certain higher-level tasks which are the domain of a computer system administrator, and not the lay user. This help information should riot be viewable by the lay user.

In prior art help systems, state-dependent content could be viewed, however, the functionality for providing this adaptable content had to be built into the application which was being queried used for the content. This introduced some security concerns, because a viewer could be modified to allow a user to view content which the user should not view. Additionally, having the viewer determine which content should be displayed requires the viewer to access certain state information about the computer system, which may introduce privacy concerns and complexity. An additional drawback is that each viewer would need identical functionality to view some item of content or the content could not be reused.

Thus, there is a need for a system and method to overcome these deficits in the prior art. The present invention addresses the aforementioned needs and solves them with additional advantages as expressed herein.

SUMMARY OF THE INVENTION

In order to allow for states of the user's computing environment to be reflected in the content presented to the user, conditional marking is used by a content author. This conditional marking is used with respect to certain elements of content. The conditional markings are evaluated to determine which elements of content the user will see when the user requests to see the content. For example, help content will be modified according to the conditionality in the help content to allow the user to see help content which is more closely tailored to the current situation on the user's computer.

In one embodiment, the content presented to the user is determined by accepting content including conditional content (content with conditions applied to the display of that content) and the conditions, including at least one state condition describing the user's environment (such as user's state, the state of the user's machine, or the state of the user's application) are evaluated. The resulting content can then be used for display to a user.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

According to one embodiment of the invention, an improved authoring scheme for content which is to be displayed to a user is provided. A help system will be used in this specification to describe the invention, however, the invention is not limited to use in help systems, but rather can be more widely used, for example, in other systems where content is authored so that different elements of the content are displayed to a user based on the state of the user's computer system environment.

Exemplary Computing Environment

Figure 1:
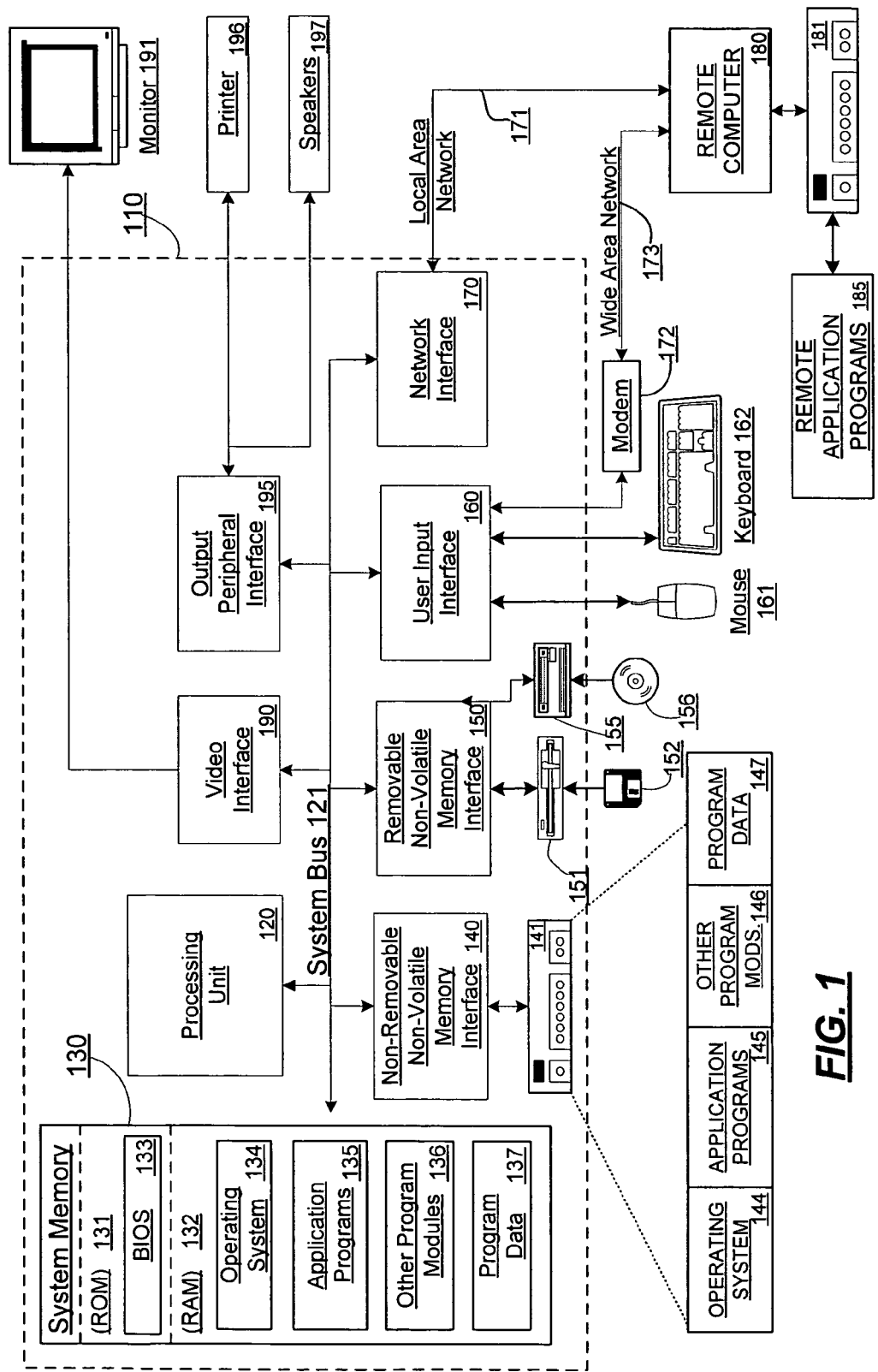
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

State Monitors

In one embodiment, the information describing the state of the user's computer system is provided by state monitors.

As described in application Ser. No. 10/754,984 filed on Jan. 9, 2004 entitled "System and Method for Context Sensitive Searching," state monitors can be used to monitor the state of the computing environment and use the individual states of the various components of the environment, including hardware, software, firmware, user preferences, software operating modes, and any other detectable state to provide a context to searches for information such as help information.

State information can include any information about the user, the state of the user's machine, and the state of application(s) being run by the user.

A collection of monitors is used to provide state information. Each monitor tracks information about a particular state including whether it is currently true or false. States may be very simple like having a printer attached or complex like having an HP 770 printer attached that has low toner and is the current user's default printer. In one embodiment, the only states that are monitored are ones that have been explicitly requested by some application.

Examples of states which may be useful in determining the context of a search include hardware, software, and user preferences and controls. Hardware states may include the type, model, and make of hardware attached to the user computing device. Internet connection state, the local network and the presence of a shared printer, multiple displays, and the type of network are also examples of states in a computing environment. Examples of software states may be the version of operating system used or the application being run and the mode of the application such as editing a document or creating an equation for calculation in a spreadsheet. Examples of user related states include user preferences and conditions such as whether the user is a system administrator, whether the user has selected specific styles or modes in the generation or viewing of documents. Additional states representative of the computing environment may be monitored as new content is downloaded or new applications are installed.

One type of monitor may be an installed hardware monitor. The monitor may be used to indicate a state of specific hardware installed in the local computing environment. Based on the hardware monitors, results, such as the presentation of data resulting from help searches, may be modified. The modification may be of the form of an exclusion of search result data from presentation to the user. The modification may also involve the use of logical Boolean functions such as AND, OR and NOT in relation to data and the state of other monitors.

Monitors can be used in a logical manner as well to sense the combined condition of multiple states within a computing environment to enhance searches. Given a search for information concerning the printing of a file to a printer, the search may use the state monitors for both the presence of a CDRW as well as the type of printer connected to the user's system under a logical AND function. Thus, where help information would normally only provide information concerning printing a file to a printer, but the file to be printed may be resident on the CDRW in the user's environment, the hardware monitors for the CDRW and the printer under the logical AND function may indicate that not only information concerning generic file printing may be appropriate, but also information that specifically relates to printing a file from a CDRW to the specific type of printer which the monitor indicates is attached to the computer system may be relevant to the user. Other logical functions (NOT, OR, etc.) may also be used to combine state monitor information.

Use of the State Information to Provide State-Dependent Information

Figure 2:
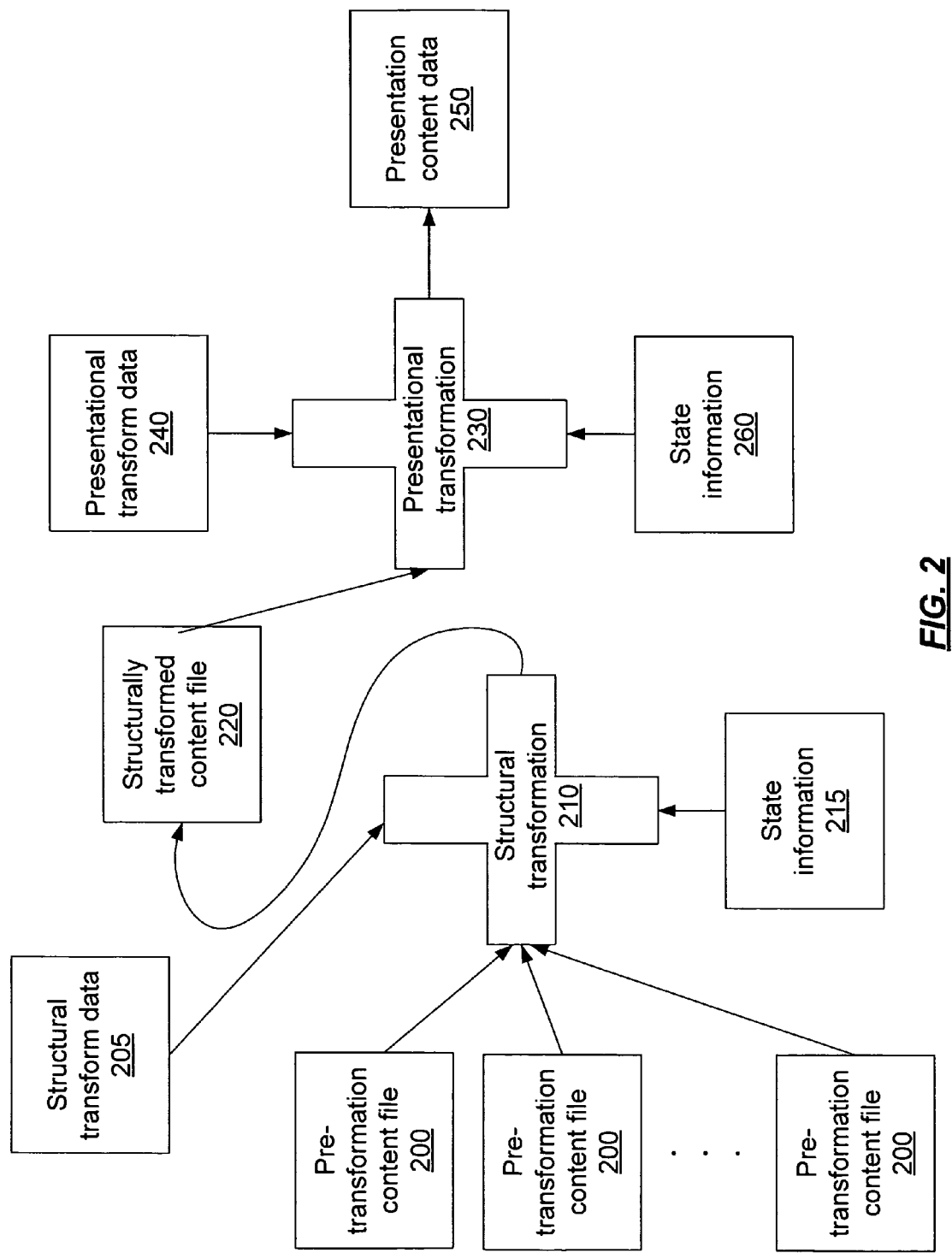
FIG. 2 is a block diagram of the transformation of content using state information to provide state-dependent information for viewing according to one embodiment of the invention.

FIG. 2 illustrates the use of state information in providing state-dependent information. As shown in FIG. 2, in order to provide state-dependent information, according to one embodiment, a number of pre-transformation content files 200 are used together, along with structural transform data 205 as inputs to a structural transform 210. These pre-transformation content files 200 contain content. In one embodiment, the content is help content for a help system. The content is in a particular format. In one embodiment, the format is a semantically-marked format, which can be used to allow uniformity and security in providing content from varied sources. More details about semantically-marked content are contained in co-pending U.S. patent application Ser. No. 10/819,661, entitled "Presentation-Independent Semantic Authoring of Content" filed on the same date as the present application.

The pre-transformation content files 200 include content which is conditioned on a state/context of the computer system in which it is to be displayed. For example, the pre-transformation content may include instructions for administrators, as in the following pseudo code example:

---
Changing A Password -
---
In order to change a password, select the Change Password option in the session management menu. Type in the User ID and the current password in the indicated fields. A new prompt will ask you for the new password in an additional field. This new password will need to be typed in twice in order to take effect.
<para condition="IsAdmin">
If the current password has been lost by a user, an administrator may reset the password by opening the Reset User Password menu in the administration menu, which will be viewable only when logged on as an administrator. Enter the User ID and a new password in the indicated fields.
</para>
<para condition=NOT("IsAdmin")>
If you have forgotten your password, please consult an administrator.
</para>

---

The header ("Changing a Password") and the first paragraph will appear whenever the state-independent content is viewed. The second paragraph (surrounded by <para condition="IsAdmin"> and </para> in the pseudo code) will appear if the content is rendered where the state of the "IsAdmin" monitor is true, indicating that the user who will view the content is an administrator. If the state of "IsAdmin" is false, then the last paragraph will be displayed to the user. Thus, state-dependent content is presented only in the correct context for its display.

As another example, pre-transformation content files 200 can also include conditional references based on the presence or absence of certain hardware. Thus, a user who looks for help in printing will be given help instructions for the specific printer which is attached to the user's computer system. A user who requests help in saving a file will receive instructions on saving the file to whichever of: a hard disk, a floppy disk, a CDRW, or an external storage device is attached to the user's computer. In the above pseudo code, the state "IsAdmin" has a value of true or false. In one embodiment, all states have values of true or false. In other embodiments, states may contain varied values, for example, with a "PrinterCondition" state having a number of possible values (e.g. "off", "out-of-paper", "busy", or "ready", among others.)

The way this information is presented to a user is via the transformations shown in FIG. 2. A number of pre-transformation content files 200 may be combined in order to provide content for a display to the user. For example, in the context of a help system, it may be helpful to have a fragment of a help topic displayed along with one other fragment in one help topic, and with other fragments in a different help topic. If a number of help topics will direct a user to a control panel, for example, only one fragment needs to describe the access for that control panel, and then other fragments can describe different actions to take once the control panel is accessed. In order to execute such a combination of fragments of content for a single display, as shown in FIG. 2, the pre-transformation content file 200 for each of the help fragments is an input to a structural transformation 210. Any number of structural transformations 210 may be performed (including none). The result of any structural transformations is a complete structurally-transformed content file 220. Additional inputs to the structural transformation 210 are state information 215 and structural transform data 205. The state information 215 provides state information for the structural transform 210, for evaluating any conditional statements that are to be evaluated during the structural transformation stage. The structural transform data includes data describing how the structural transformation should be accomplished. For example, where the pre-transformation content files 200 are in XML (extensible markup language), the format for the structural transform data may be XSLT (extensible style sheet language transform) which defines how a transformation should be applied to the XML-formatted pre-transformation content files 200.

A presentational transform 230 is then applied to the resulting structurally-transformed content file 220. Again, inputs to this include transform data (presentational transform data 240) and state information 260. The final result of this presentation transform 230 is presentation content data 250. This presentation content data 250 is presentation data in a format which can be used on the user's computer system. For example, where the user's computer system has the ability to display data in HTML (hypertext markup language) format, the presentation content data may be in HTML format.

Figure 3:
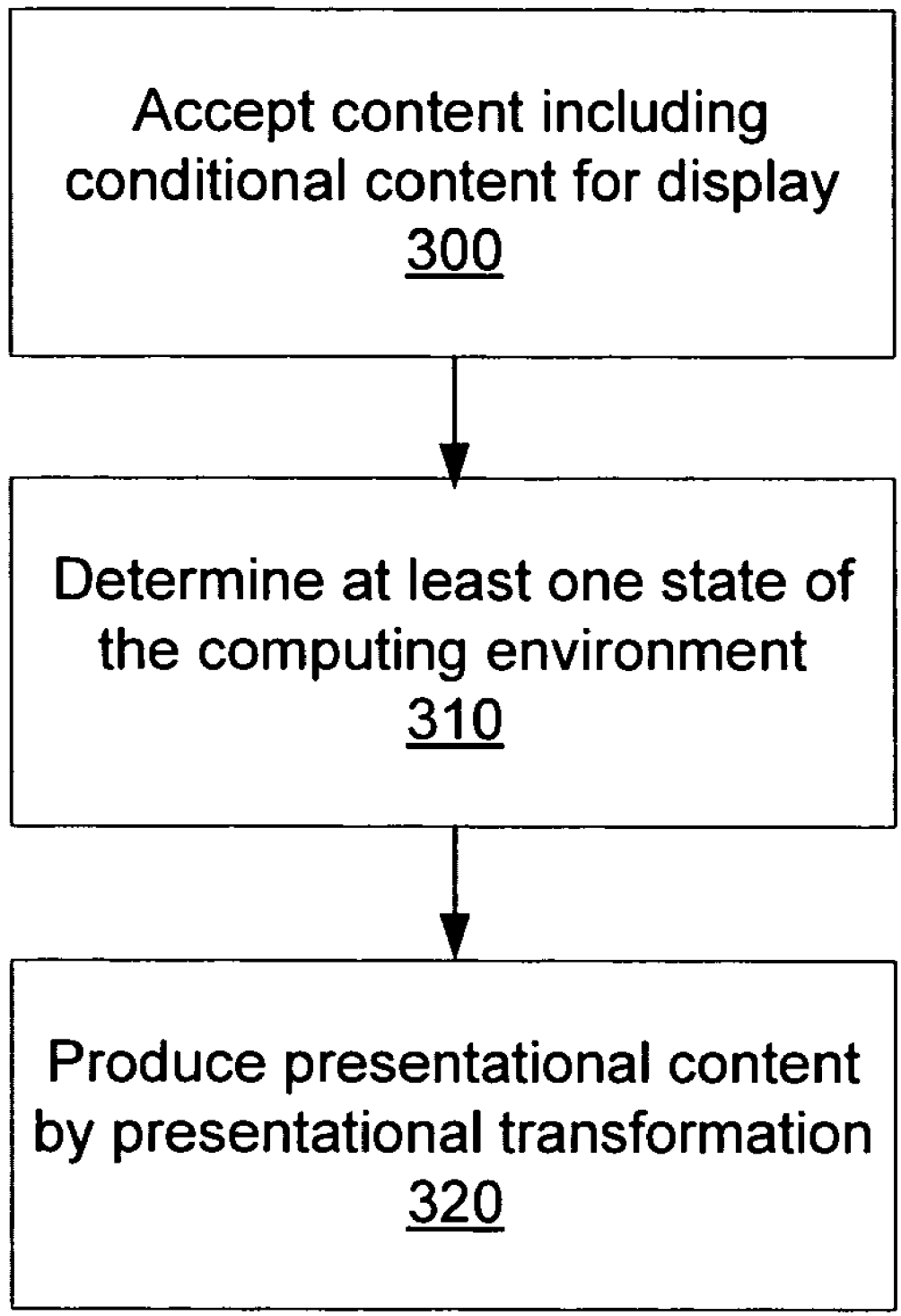
FIG. 3 is a flow diagram of a method for providing state dependent content according to one embodiment of the invention.
Figure 4:
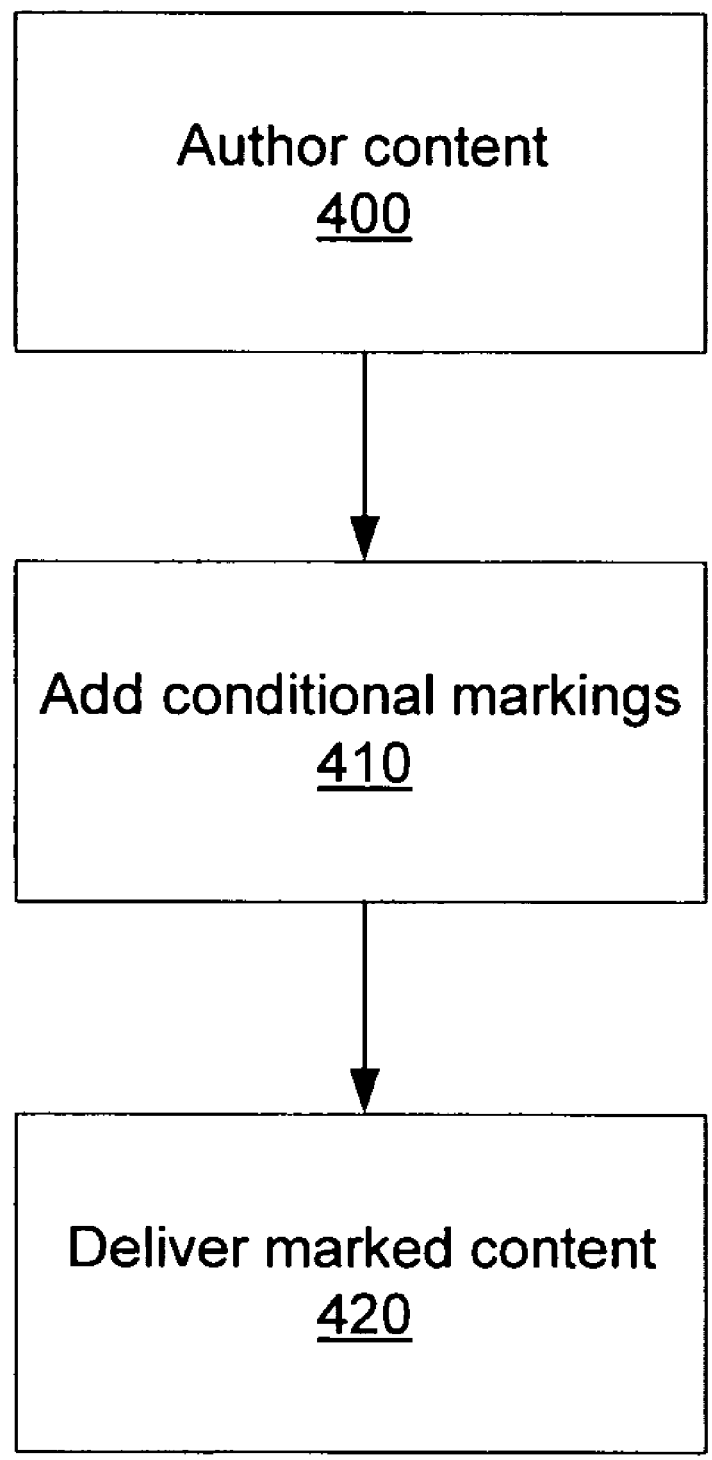
FIG. 4 is a flow diagram of a method for producing content for display according to one embodiment of the invention.

FIG. 3 is a flow diagram of a method for providing state dependent content according to one embodiment of the invention. As shown in FIG. 3, such a method begins with the acceptance of content containing conditional content for display, step 300. At least one state of the computing environment is determined in step 310. Presentational content is produced by a presentational transformation of the content according to the state in step 320. Additionally, though not shown in FIG. 3, one or more structural transformations may occur before the presentational transformation of step 320. FIG. 4 is a flow diagram of a method for producing content for display according to one embodiment of the invention. As shown in FIG. 4, step 400, content is authored. In step 410, conditional marking(s) are added to the content. In step 420, the content is delivered.

With reference again to FIG. 2, depending on a number of factors, the evaluation of conditional statements may be performed in a structural transformation 210 or in the presentation transform 230. If, for example, the evaluation of conditional statements is performed in the structural transformation, the structural transformation 210 may remove the non-applicable content from the structurally-transformed content file 220. In this case, even by examining the source for the presentation content data 250 (the actual HTML file, e.g., rather than the display resulting from the HTML file) a user could not see the non-applicable content. This provides security benefits.

The evaluation of conditional statements may also be performed in the presentational transformation 230. In this case, the non-applicable content may be hidden from the user, however it may still be present in the presentation content data 250, for example as hidden or invisible text. The source for the presentation content data 250 may therefore include that non-applicable content. Depending on the viewing options, the option may be provided to a user to view hidden text. This allows a user flexibility, to see what the content would have been in other situations. In another embodiment, the presentation transform 230 functions as a "cold filter" in which content gets excluded from the presentation content data 250 and is not viewable.

Figure 5:
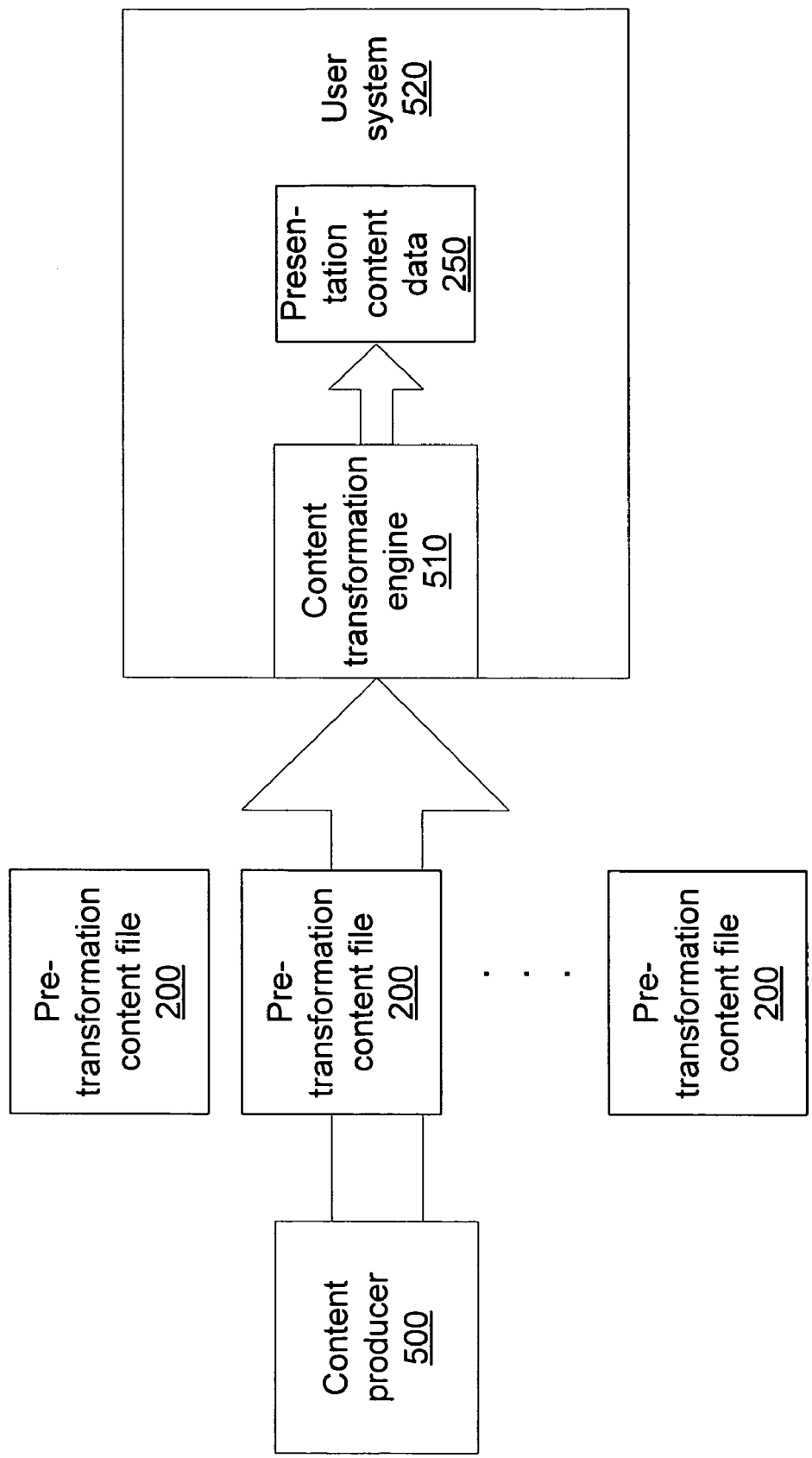
FIG. 5 is a block diagram of the content transformation engine on a user's computer system according to one embodiment of the invention.

The transformation(s) as shown in FIG. 2 occurs, in one embodiment, in a content transformation engine. In one embodiment, the structural transformations (if any) and the presentational transformation occur on the user's computer system. FIG. 5 shows one example of the content transformation engine on a user's computer system. A content producer 500 provides one or more pre-transformation content files 200. These files may come from one content producer, or from a number of content producers. A content transformation engine 510 on the user system 520 transforms these into presentation content data 250. In one embodiment, the transformation occurs when the pre-transformation content files 200 are needed in the help system.

Conclusion

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method of providing state-dependent content to a user's computing environment comprising:
   accepting authored pre-transformation content in a content file comprising conditional content to be displayed by the user's computing environment only under a certain condition relating to at least one state of the computing environment;
   determining said at least one state of the computing environment;
   evaluating conditional statements in said authored pre-transformation content relative to said at least one state to determine what conditional content will be displayed; and
   producing presentational content for display by the computing environment by at least one structural transform of said accepted authored pre-transformation content based on said determination, wherein said at least one structural transform comprises adding or removing conditional content to or from said pre-transformation content to tailor it to different computing environment states.

2. The method of claim 1, where said determination of said at least one state of the computing environment comprises consulting a state monitor.

3. The method of claim 1, where said at least one state of the computing environment comprises a state selected from the following group: a state of a user of said computing environment, a state of a hardware element of said computing environment, a state of software present in said computing environment, a state of an application running in said computing environment, user preferences in said computing environment, and controls set in said computing environment.

4. The method of claim 1, further comprising:
   combining said accepted authored pre-transformation content with additional content by at least one structural transform defining how said combination should occur.

5. The method of claim 1, where said accepted authored pre-transformation content is in XML format.

6. The method of claim 1, where an input to said structural transform is transform data in XSLT format.

7. The method of claim 1, where said step of producing presentational content comprises removing some portion of said accepted authored pre-transformation content.

8. The method of claim 1, where said step of producing presentational content comprises setting some portion of said accepted authored pre-transformation content to not be displayed.

9. The method of claim 8, where said setting some portion of said accepted pre-transformation authored content to not be displayed comprises allowing a user to see said portion of said accepted authored pre-transformation content only on request.

10. A computer readable storage medium having stored thereon a plurality of computer-executable instructions, a co-processing device, and a computing device on which the method of claim 1 is performed.

11. A method of producing state-dependent content for display by a user's computing environment comprising:
   authoring pre-transformation content to be displayed by the user's computing environment;
   adding to the pre-transformation content at least one conditional marking of some portion of said pre-transformation content to be displayed under a certain condition relating to at least one state of the computing environment;
   delivering said conditionally marked pre-transformation content in a content file for the production of presentational content for display by the computing environment by a structural transformation of the conditionally marked pre-transformation content based on an evaluation of said at least one conditional marking relative to the current value of said at least one state, wherein said structural transformation comprises adding or removing content to or from said pre-transformation content to tailor it to different computing environment states.

12. A computer readable storage medium having stored thereon a plurality of computer-executable instructions, a co-processing device, and a computing device on which the method of claim 11 is performed.

13. A computing system comprising a processor configured to provide state-dependent content to a user's computing environment (hereinafter computing environment) comprising:
   content storage configured to accept authored pre-transformation content in a content file comprising conditional content to be displayed by the computing environment only under a certain condition relating to at least one state of the computing environment;
   at least one state monitor configured to determine said at least one state of the computing environment;
   an evaluator configured to evaluate conditional statements in said authored pre-transformation content relative to said at least one state to determine what conditional content will be displayed; and
   a transformer configured to produce presentational content for display by the computing environment by at least one structural transform of said accepted authored pre-transformation content based on said determination, wherein said at least one structural transform comprises adding or removing conditional content to or from said pre-transformation content to tailor it to different computing environment states.

14. The computing system of claim 13, where said at least one state of the computing environment comprises a state selected from the following group: a state of a hardware element of said computing environment, a state of software present in said computing environment, user preferences in said computing environment, and controls set in said computing environment.

15. The computing system of claim 13, further comprising:
a structural transformer configured to combine said accepted authored pre-transformation content with additional content by at least one structural transform defining how said combination should occur.

16. The computing system of claim 15, where said accepted authored pre-transformation content is in XML format.

17. The computing system of claim 13, where an input to said transformer is transform data in XSLT format.

18. The computing system of claim 13, where said structural transform removes some portion of said accepted authored pre-transformation content.

19. The computing system of claim 13, where said structural transform sets some portion of said accepted authored pre-transformation content to not be displayed.

20. The computing system of claim 19, where said setting of some portion of said accepted authored pre-transformation content to not be displayed allows a user to see said portion of accepted authored pre-transformation content only on request.

21. A computing system comprising a processor configured to produce state-dependent content for display by a user's computing environment comprising:
a content acceptor configured to accept authored pre-transformation content in a content file to be displayed by the user's computing environment;
a conditional marking adder configured to add at least one conditional marking of some portion of said authored pre-transformation content to be displayed under a certain condition relating to at least one state of the computing environment; and
a content deliverer configured to deliver said authored conditionally marked pre-transformation content in the content file for the production of presentational content for display by the computing environment by a structural transformation of the conditionally marked pre-transformation content based on an evaluation of said at least one conditional marking relative to the current value of said at least one state, wherein said structural transformation comprises adding or removing pre-transformation content to or from said pre-transformation content to tailor it to different computing environment states.

* * * * *